(12) United States Patent
Misra et al.

(10) Patent No.: US 10,303,523 B2
(45) Date of Patent: May 28, 2019

(54) METHOD AND APPARATUS TO MIGRATE STACKS FOR THREAD EXECUTION

(71) Applicant: Apple Inc., Cupertino, CA (US)

(72) Inventors: Ronnie Misra, San Jose, CA (US); Joshua Shaffer, Woodside, CA (US)

(73) Assignee: Apple Inc., Cupertino, CA (US)

( * ) Notice: Subject to any disclaimer, the term of this patent is extended or adjusted under 35 U.S.C. 154(b) by 445 days.

(21) Appl. No.: 14/836,937

(22) Filed: Aug. 26, 2015

(65) Prior Publication Data

US 2015/0363241 A1     Dec. 17, 2015

Related U.S. Application Data

(62) Division of application No. 12/174,603, filed on Jul. 16, 2008, now Pat. No. 9,135,054.

(51) Int. Cl.
*G06F 9/30* (2018.01)
*G06F 9/50* (2006.01)
*G06F 9/46* (2006.01)
*G06F 9/54* (2006.01)

(52) U.S. Cl.
CPC ............ *G06F 9/5088* (2013.01); *G06F 9/461* (2013.01); *G06F 9/544* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 5,845,129 A | 12/1998 | Wendorf et al. | |
| 6,910,213 B1 | 6/2005 | Hirono et al. | |
| 7,805,573 B1* | 9/2010 | Coon | G06F 12/0842 711/132 |
| 7,823,131 B2* | 10/2010 | Gard | G06F 11/3656 712/227 |
| 2003/0163675 A1 | 8/2003 | Bennett et al. | |
| 2005/0102673 A1* | 5/2005 | DeWitt, Jr. | G06F 11/3636 718/100 |
| 2005/0216701 A1* | 9/2005 | Taylor | G06F 8/447 712/34 |
| 2006/0026312 A1* | 2/2006 | Chauvel | G06F 9/30174 710/23 |
| 2006/0136930 A1 | 6/2006 | Kaler et al. | |
| 2007/0220513 A1* | 9/2007 | Hwang | G06F 9/524 718/1 |
| 2008/0178189 A1* | 7/2008 | Findeisen | G06F 9/5016 718/104 |
| 2009/0217006 A1* | 8/2009 | Pedersen | G06F 11/366 712/214 |

FOREIGN PATENT DOCUMENTS

JP          2006139495 A      6/2006

* cited by examiner

*Primary Examiner* — William B Partridge
(74) *Attorney, Agent, or Firm* — Dickinson Wright RLLP (57) ABSTRACT

A method and an apparatus that generate a request from a first thread of a process using a first stack for a second thread of the process to execute a code are described. Based on the request, the second thread executes the code using the first stack. Subsequent to the execution of the code, the first thread receives a return of the request using the first stack.

20 Claims, 7 Drawing Sheets

METHOD AND APPARATUS TO MIGRATE STACKS FOR THREAD EXECUTION

CROSS-REFERENCE TO RELATED APPLICATIONS

This application is a divisional of U.S. application Ser. No. 12/174,603, entitled "METHOD AND APPARATUS TO MIGRATE STACKS FOR THREAD EXECUTION," filed Jul. 16, 2008, now U.S. Pat. No. 9,135,054, issued Sep. 15, 2015, the content of which is incorporated herein by reference in its entirety for all purposes.

FIELD

The present invention relates generally to multi-thread systems. More particularly, this invention relates to migrating thread stacks for thread context switching.

BACKGROUND

Advancement of computing systems has allowed a software program to run as one or more execution entities, such as threads, processes, and so forth. Usually, such a software program may cause thread context switching running from one thread to another. As a result, resources are allocated dynamically to coordinate activities among execution entities. For example, a synchronization mechanism is activated when more than one threads in a process concurrently request a single-thread service which allows only one thread to access at a time. Usually, synchronization mechanism requires allocation of synchronization resources such as events, mutexes, or locks, etc. Therefore, available resources for execution entities are reduced and the performance of a computing system can be compromised when synchronizing threads.

Although it may be possible to dedicate a single thread to perform a single thread task, such a thread is likely to idle most of the time wasting valuable computing resources when no request is present for its service. Additionally, a thread has to communicate with the single thread to obtain its service. Often times, communications between threads may incur message passing, queuing, and/or notifications, etc. which, again, may drain away resources from computing systems.

Therefore, system performance can be improved if multiple threads are synchronized leveraging existing mechanisms already established, such as thread context switching in a multi-threading system, without requiring allocating additionally resources.

SUMMARY OF THE DESCRIPTION

An embodiment of the present invention includes methods and apparatuses that generating a request from a first thread of a process using a first stack for a second thread of the process to execute a code. Based on the request, the second thread executes the code using the first stack. Subsequent to the execution of the code, the first thread receives a return of the request using the first stack.

In an alternative embodiment, a first thread in a process executes a first code to update a stack associated with a first stack trace. A second thread in the same process executes a second code to update the stack. The updated stack is associated with a second stack trace on top of the first stack trace. A stack trace is displayed to provide debug information for the second thread. The displayed stack traced includes both the first stack trace and the second stack trace.

In an alternative embodiment, a first thread in a process generates a first request using a first stack for a main thread of the process to execute a code. A second thread of the same process generates a second request using a second stack for the main thread to execute the code. Separately, the main thread executes the code using the first stack according to the first request and executes the code using the second stack according to the second request.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for stack migration are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, stack migration may be designed to provide a method and an apparatus that migrate a stack from one thread to another thread. A single existing thread, such as a main thread in a process, may execute a code using migrated stacks from multiple threads of the same process in a synchronous manner. In one embodiment, a thread in a process may call an API (application programming interface) that causes a stack migration associated with a main thread to execute a code as part of parameters passed to the API. A thread may execute a code using a stack migrated from another thread waiting for a return from the execution of the code. In one embodiment, stack migration may cause a debug system to display a single stack trace associated with executions by more than one threads.

Figure 1:
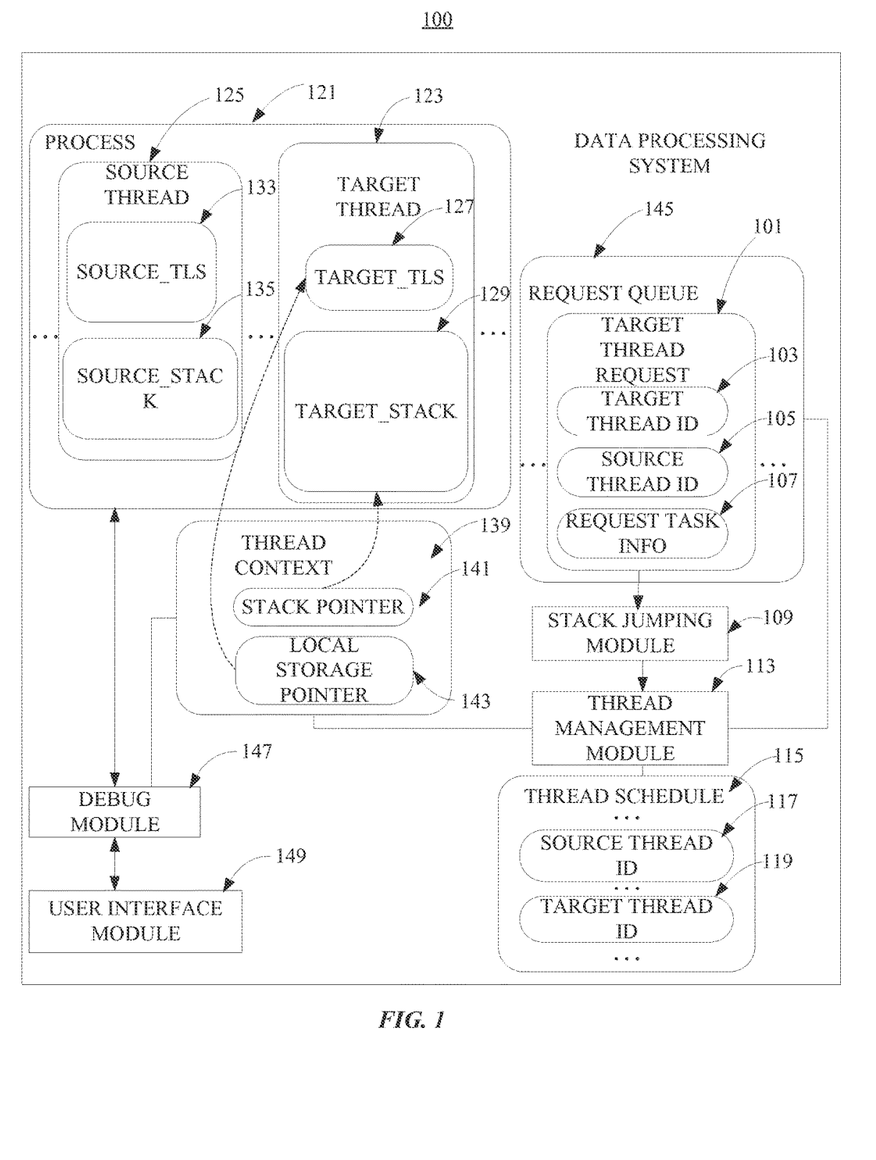
FIG. 1 is a block diagram illustrating one embodiment of a system for stack migration.

FIG. 1 is a block diagram illustrating one embodiment of a system for stack migration. In one embodiment, system 100 may be a computer operating environment including a running process 121 having more than one threads such as Source thread 125 and Target thread 123. A thread may include a stack for executing instructions associated with the thread, such as Source_stack 135 of Source thread 125. Additionally, a thread may own a thread local storage (TLS) which may be updated only by the owning thread, such as Source_TLS 133 of Source thread 125. In one embodiment, system 100 may include a thread context 139 for running a thread. A thread context 139 may include a stack pointer 141 and a local storage pointer 143 pointing respectively to a stack and a thread local storage of a running thread, such as Target_stack 129 and Target_TLS 127 of Target thread 123. When switching from one thread to another during runtime, system 100 may update a stack pointer and a local storage pointer in a thread context to point to the corresponding stack and local storage of the thread switched to. Additionally, system 100 may include a debug module 147 which may receive user request from User interface module 149 to intercept operations of system 100 and presenting a state of system 100, such as a stack trace from Source_stack 135 or Target_stack 129 via User interface module 149.

In one embodiment, system 100 may include a thread request to schedule a target thread to perform a task. A running thread may generate a thread request for a target thread to perform a task. In one embodiment, a thread request, such as Target thread request 101, may include an identifier for a target thread, such as Target thread ID 103 to identify Target thread 123, an identifier for a running thread which generates the request, such as Source thread ID 105 to identify Source thread 125, and information on the intended task, such as Request task info 107, which might include a pointer to a function code. In one embodiment, a thread request may be stored in a request queue, such as Request queue 145, to be processed in an order according to a thread management module 113. A thread management module 113 may update a schedule for running threads, such as Thread schedule 115, based on a request queue 145. For example, Thread schedule 115 may include Target thread id 119 which identifies Target thread 123 as currently running thread and Source thread id 117 which identifies Source thread 125 as a thread scheduled to run subsequently.

In one embodiment, system 100 may include a stack jumping module 109 which performs stack migration between a source thread and a target thread identified in a thread request. A stack jumping module 109 may migrate a stack from a source thread, such as Source_stack 135, to a target thread, such as Target thread 123, according to a thread request, such as Target thread request 101. In one embodiment, a stack jumping module 109 may update a thread context 139 for migrating stacks. For example, when running Target thread 123, a stack jumping module 109 may update a thread context 139 including a local storage pointer 143 and a stack pointer 141 pointing respectively to Target_stack 129 and Target_TLS 127 of Target thread 123. A running thread may be the one selected to run from among more than one threads already scheduled. In one embodiment, no more than one running thread may be associated with a single processor at a time. A stack jumping module 109 may perform a request task, such as according to Request task info 107 of Target thread request 101, subsequent to updating a thread context 139 for stack migration.

Figure 2:
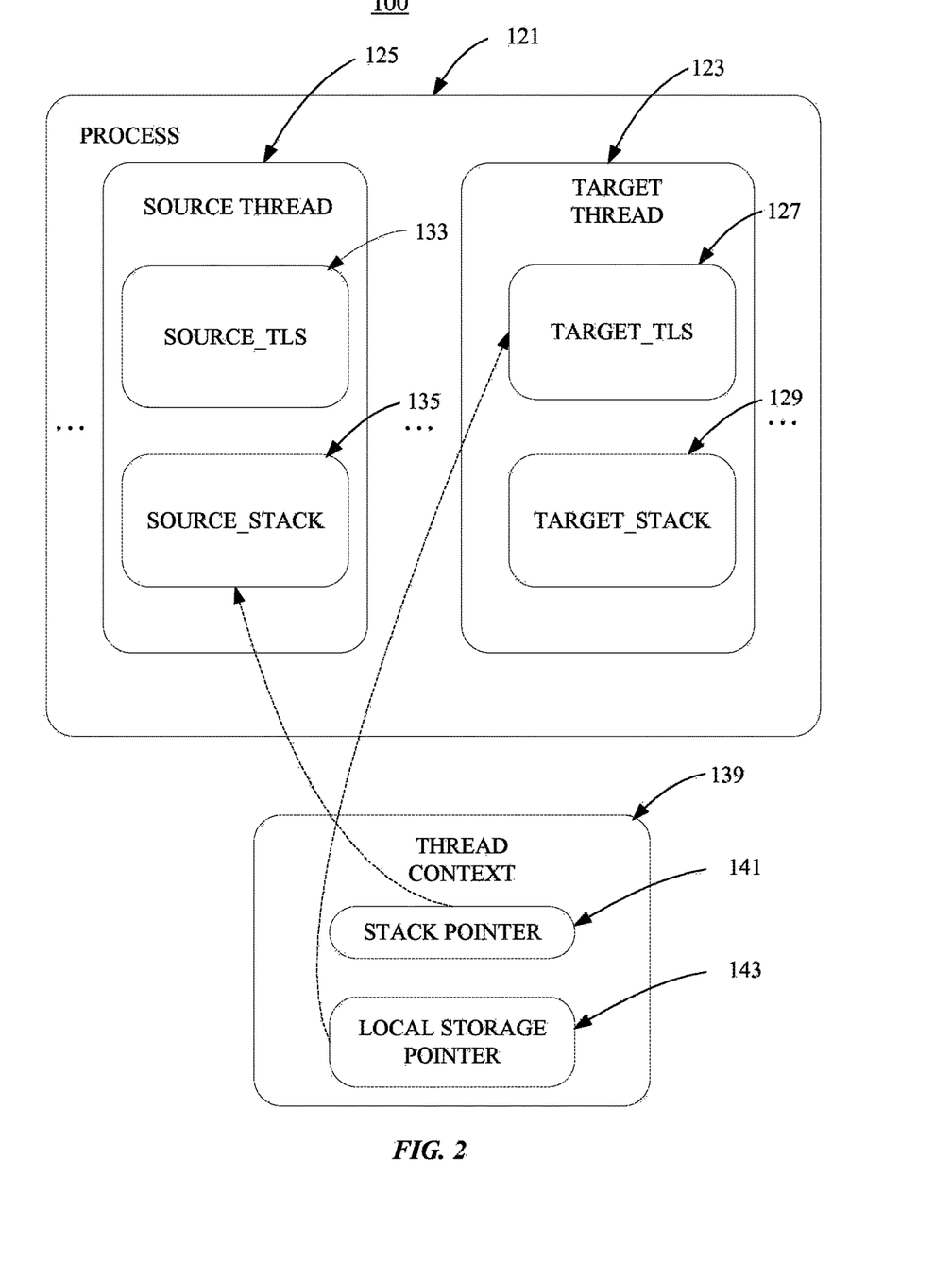
FIG. 2 is a block diagram illustrating one embodiment of a stack which has been migrated.

FIG. 2 is a block diagram illustrating one embodiment of a stack which has been migrated. In one embodiment, Source_stack 135 of Source thread 125 is migrated to Target thread 123 via a stack jumping module 109 of FIG. 1 which updates a stack pointer 141 of a thread context 139 from pointing to Target_stack 129 of Target thread 123 to Source_stack 135 of Source thread 125. A request for migrating Source_stack 135 may be generated when running Source thread 125. In one embodiment, a stack jumping module 109 may perform a requested task, such as based on Request task info 107 of FIG. 1, under Target thread 123 using a migrated stack, such as Source_stack 135 of Source thread 125, according to an updated thread context 139.

Figure 3:
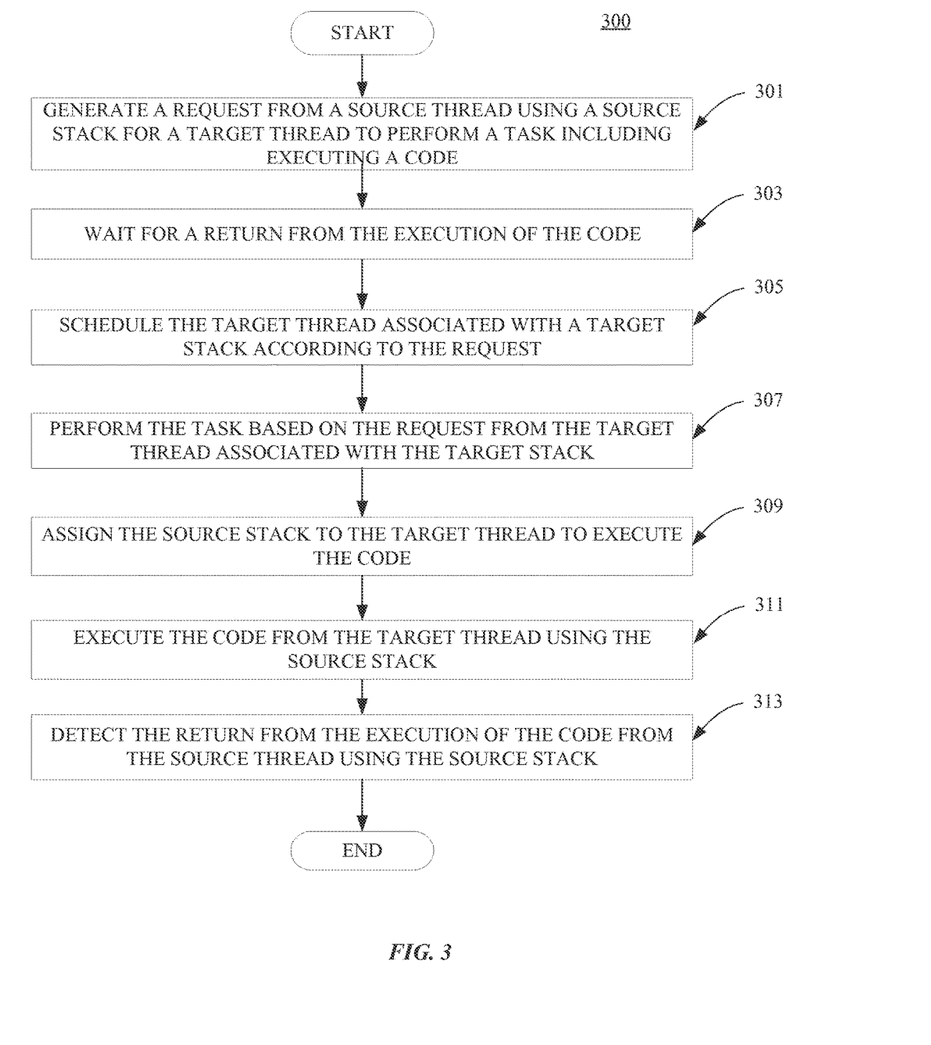
FIG. 3 is a flow diagram illustrating one embodiment of a process for migrating a stack.

FIG. 3 is a flow diagram illustrating one embodiment of a process for migrating a stack. Exemplary process 300 may be performed by a processing logic that may comprise hardware (circuitry, dedicated logic, etc.), software (such as is run on a dedicated machine), or a combination of both. For example, process 300 may be performed by some components of system 100 of FIG. 1. In one embodiment, the processing logic of process 300 may run a source thread to generate a request for a target thread to perform a task including executing a code at block 301. A source thread, such as Source thread 125 of FIG. 1, may be associated with a source stack, such as Source_stack 135 of FIG. 1. The processing logic of process 300 may use the associated source stack to run the source thread. In one embodiment, a stack pointer in a thread context, such as Stack pointer 141 of Thread context 139 of FIG. 1, may point to the source stack used by the processing logic of process 300. A request may be a data structure, such as Target thread request 101 of FIG. 1, including an identifier for a target thread, such as Target thread ID 103, and an identifier for the source thread from which the request is generated, such as Source thread ID 105 of FIG. 1. Additionally, a request may include a task to be performed by a requested target thread, such as included in Request task info 107 of FIG. 1. A task may include a pointer to an executable code. The processing logic of process 300 may append a generated request to a queue, such as Request queue 145 of FIG. 1, to be processed in order with other thread requests.

If the target thread is active performing a current task when a thread request for the target thread is generated, in one embodiment, the processing logic of process 300 may not run the target thread for the request before the current task is completed. A thread may be active when scheduled to run in a thread schedule, such as Thread schedule 115 of FIG. 1. At block 303, the processing logic of process 300 running a source thread may wait for a return from an execution of a code by the requested target thread. In one embodiment, the processing logic of process 300 may detect whether a return from an execution of a code is available via a storage location. In another embodiment, the processing logic of process 300 may depend on a hardware interrupt which indicates to a waiting source thread that a return from an execution of a code by a requested target thread is available.

At block 305, according to one embodiment, the processing logic of process 300 may schedule a target thread identified according to a request, such as, for example, based on a Target thread ID 103 in Target thread request 101 of FIG. 1. An identified target thread may be associated with a target stack, such as Target_stack 129 associated with Target thread 123 of FIG. 1. The processing logic of process 300 may update a schedule, such as Thread schedule 115 of FIG. 1, to schedule an identified target thread. In one embodiment, when an identified target thread according to a request is active in a schedule, a corresponding source thread, such as Source thread ID 105 of FIG. 1, may also be active waiting for a return in the schedule. At block 307, the processing logic of process 300 may perform a task specified in a thread request from a target thread using a target stack associated with the target thread. A stack pointer of a thread context for the processing logic of process 300, such as Stack pointer 141 in Thread context 139 of FIG. 1, may point to the associated target stack used by the target thread. The processing logic of process 300 may perform a task at block 307 according to a schedule established for the target thread at block 305.

Subsequently, at block 309, the processing logic of process 300 may assign a source stack associated with a source thread to the target thread for executing a code. Thus, the source stack may be migrated to replace the target stack associated with the target thread before executing the code. A thread request, such as Target thread request 101 of FIG. 1, may identify both the source thread and the target thread. In one embodiment, the processing logic of process 300 may update a stack pointer in a thread context from a pointer pointing to a target stack to a pointer pointing to a source stack for stack migration. At block 311, the processing logic of process 300 may execute a code from the target thread using the source stack. During the execution of the code, there may be no updates on the target stack. In one embodiment, a thread request identifying a target thread may include a pointer to the code executed, such as in Request task info 107 of FIG. 1. When the execution of the code from the target thread is completed, a return may be indicated by an update in a storage location or by generating a hardware interrupt for the source thread. At block 313, in one embodiment, the processing logic of process 300 may detect a return from the execution of the code when running the source thread using the source stack. In one embodiment, the processing logic of process 300 may run the source thread using the source stack to determine if the execution of the code is complete. A schedule, such as Thread schedule 115 of FIG. 1, may include identifiers for both the source thread and the target thread to indicate that both threads are currently active waiting to be selected for running as scheduled.

Figure 4:
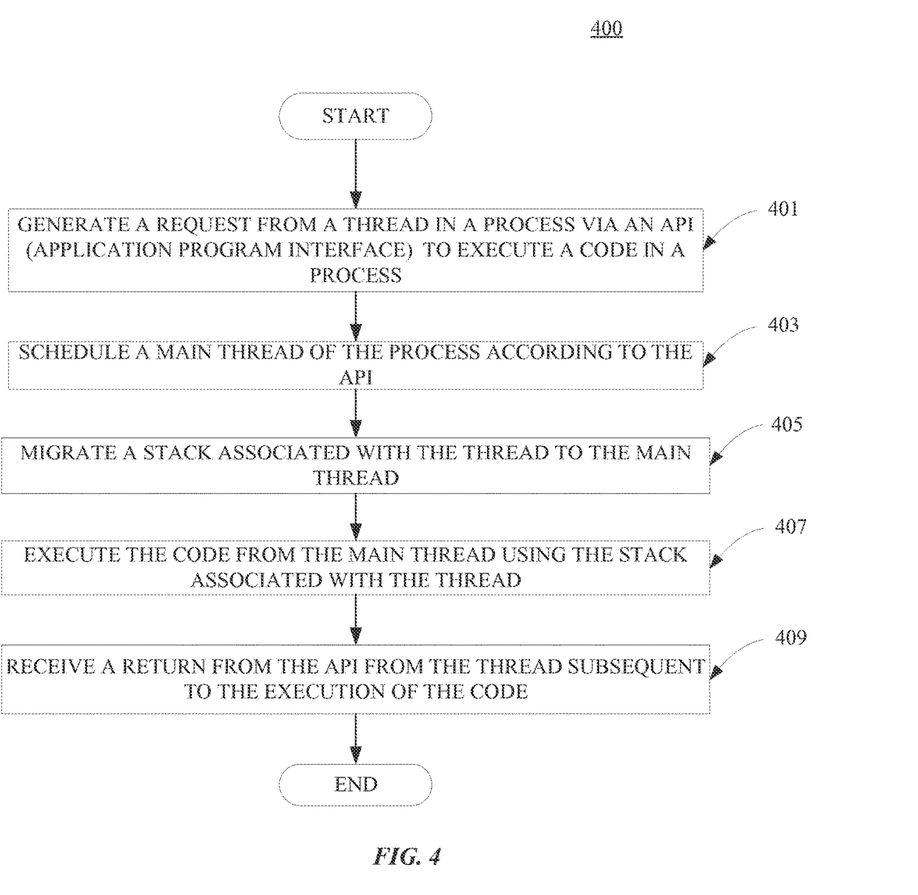
FIG. 4 is a flow diagram illustrating an embodiment of stack migration via API (Application Programming Interface) calls.

FIG. 4 is a flow diagram illustrating an embodiment of stack migration via API calls. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. The processing logic of process 400 may generate a request from a thread to execute a code via an API (Application Programming Interface) at block 401. In one embodiment, input parameters of an API may be associated with codes to be executed when the API is called. A thread may block at a call to the API waiting for a return. In one embodiment, as a result of calling an API, a request may be generated to be placed in a queue for processing, such as Request queue 145 of FIG. 1. At block 403, the processing logic of process 400 may schedule a main thread of a process associated with a calling thread to perform tasks according to an API. A process may be associated with multiple threads including a single main thread. In one embodiment, the processing logic of process 400 may identify a main thread of a process associated with the thread calling the API. The processing logic of process 400 may update a thread schedule, such as Thread schedule 115 of FIG. 1, according to a kernel based on the generated request at block 401.

According to one embodiment, the processing logic of process 400 may migrate a stack associated with a thread calling the API to the scheduled main thread at block 405. A main thread may be associated with a main stack separate from the migrated stack. Prior to migrating a stack, the processing logic of process 400 may perform operations according to the API from the main thread using a main stack associated with the main thread. In one embodiment, the processing logic of process 400 may switch a thread context from the thread calling the API at block 401 to the main thread as scheduled at block 403. During thread context switch, the processing logic of process 400 may update a local storage pointer, such as Local storage pointer 143 of FIG. 1, in a thread context, such as Thread context 139 of FIG. 1, to point to a local storage associated with a main thread and update a stack pointer, such as Stack pointer 141 of FIG. 1, of a thread context to point to a main stack associated with the main thread. To migrate a stack to a main thread, the processing logic of process 400 may update a stack pointer of a current thread context to point to the stack. At block 407, in one embodiment, the processing logic of process 400 may execute a code via an API from the main thread using the stack migrated from the thread calling the API. While the code is being executed from a main thread, a thread calling the API may be scheduled in a thread schedule. The processing logic of process 400 may perform a thread context switch to run the thread calling an API to determine if a return from the API is available. In one embodiment, subsequent to completing the execution of the code at block 409, the processing logic of process 400 may perform a thread context switch to run a thread calling an API to receive a return from the API.

Figure 5:
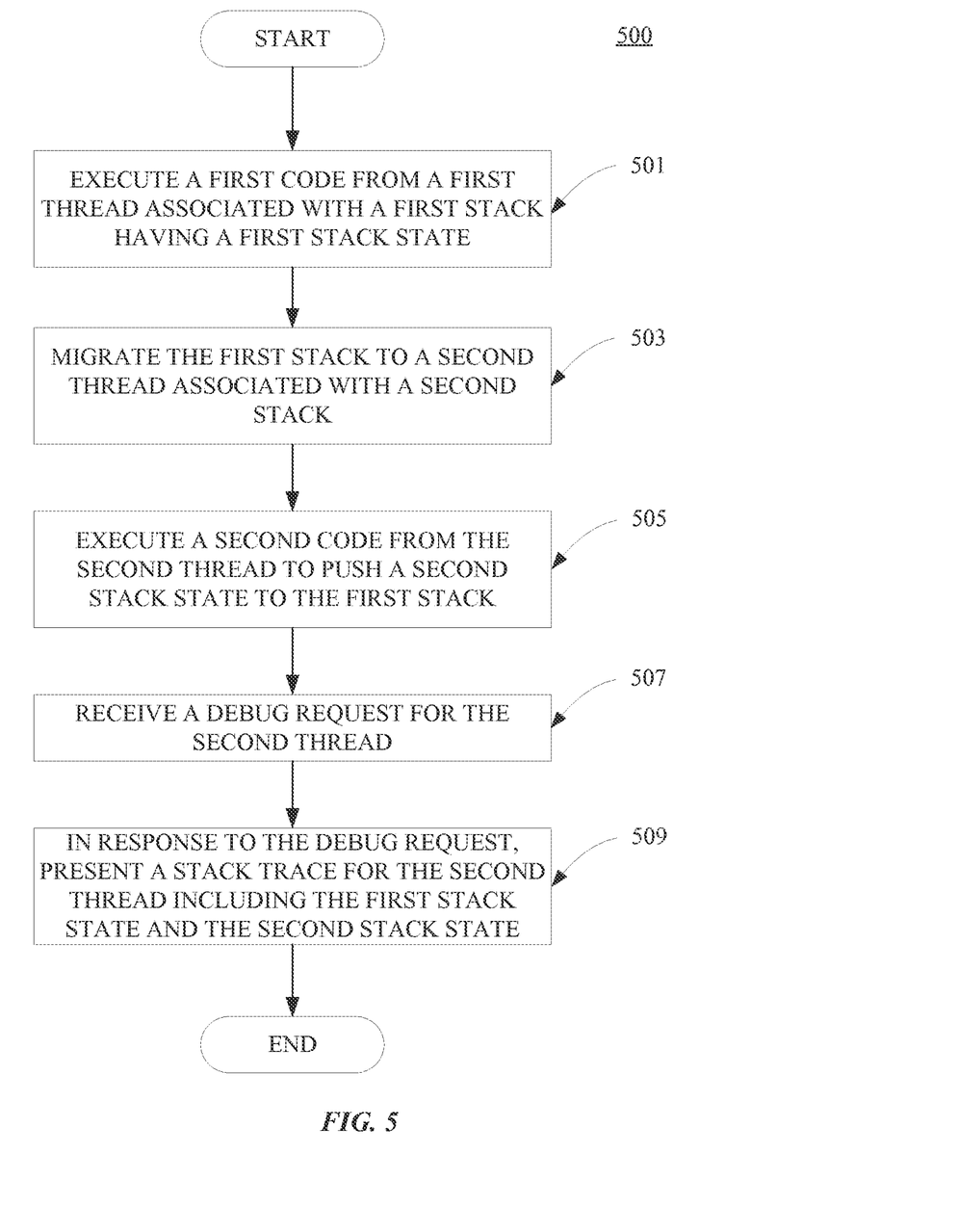
FIG. 5 is a flow diagram illustrating one embodiment of presenting a stack trace for a migrated stack.

FIG. 5 is a flow diagram illustrating one embodiment of presenting a stack trace for a migrated stack. Exemplary process 500 may be performed by a processing logic that may comprise hardware (circuitry, dedicated logic, etc.), software (such as is run on a dedicated machine), or a combination of both. For example, process 400 may be performed by some components of system 100 of FIG. 1. At block 501, the processing logic of process 500 may execute a first code from a first thread associated with a first stack, such as Source_stack 135 associated with Source thread 125 of FIG. 1. The first stack may have a first stack state. A stack may include a stack state associated with a set of values, e.g. a stack trace, currently pushed (stored) in the stack. In one embodiment, the processing logic of process 500 may include a stack pointer in a thread context, such as Stack pointer 141 of Thread context 139 of FIG. 1, pointing to the first stack of the first thread to execute the first code.

At block 503, the processing logic of process 500 may migrate the first stack of the first thread to a second thread associated with a second stack. Both the first thread and the second thread may belong to one single process. To migrate the first stack, in one embodiment, the processing logic of process 500 may update, from a second thread, such as Target thread 123 of FIG. 1, a stack pointer in a thread context pointing to the second stack, such as Stack pointer 141 pointing to Target_stack 129 of FIG. 1, to point to the first stack associated with the first thread, such as Source_stack 135 of Source thread 125 in FIG. 1. Subsequently at block 505, in one embodiment, the processing logic of process 500 may execute a second code from the second thread to push a second stack state to the first stack on top of the first stack state of the first stack. The second stack state may be generated according to the execution of the second code from the second thread.

In one embodiment, at block 507, the processing logic of process 500 may receive a debug request, such as from Debug module 147 of FIG. 1, according to a debug command from a user. The processing logic of process 500 may perform debug operations such as inspecting debug information including a stack state for a thread. At block 509, in one embodiment, the processing logic of process 500 may retrieve a current stack state from the second thread to present a stack trace in response to the debug request. The processing logic of process 500 may present a stack trace via a user interface, such as User interface module 149 of FIG. 1, to a user based on the retrieved stack state of the second thread, including both the first stack state and the second stack state. In one embodiment, the processing logic of process 500 may present a separate stack trace for the first thread including also both the first stack state and the second stack state.

Figure 6:
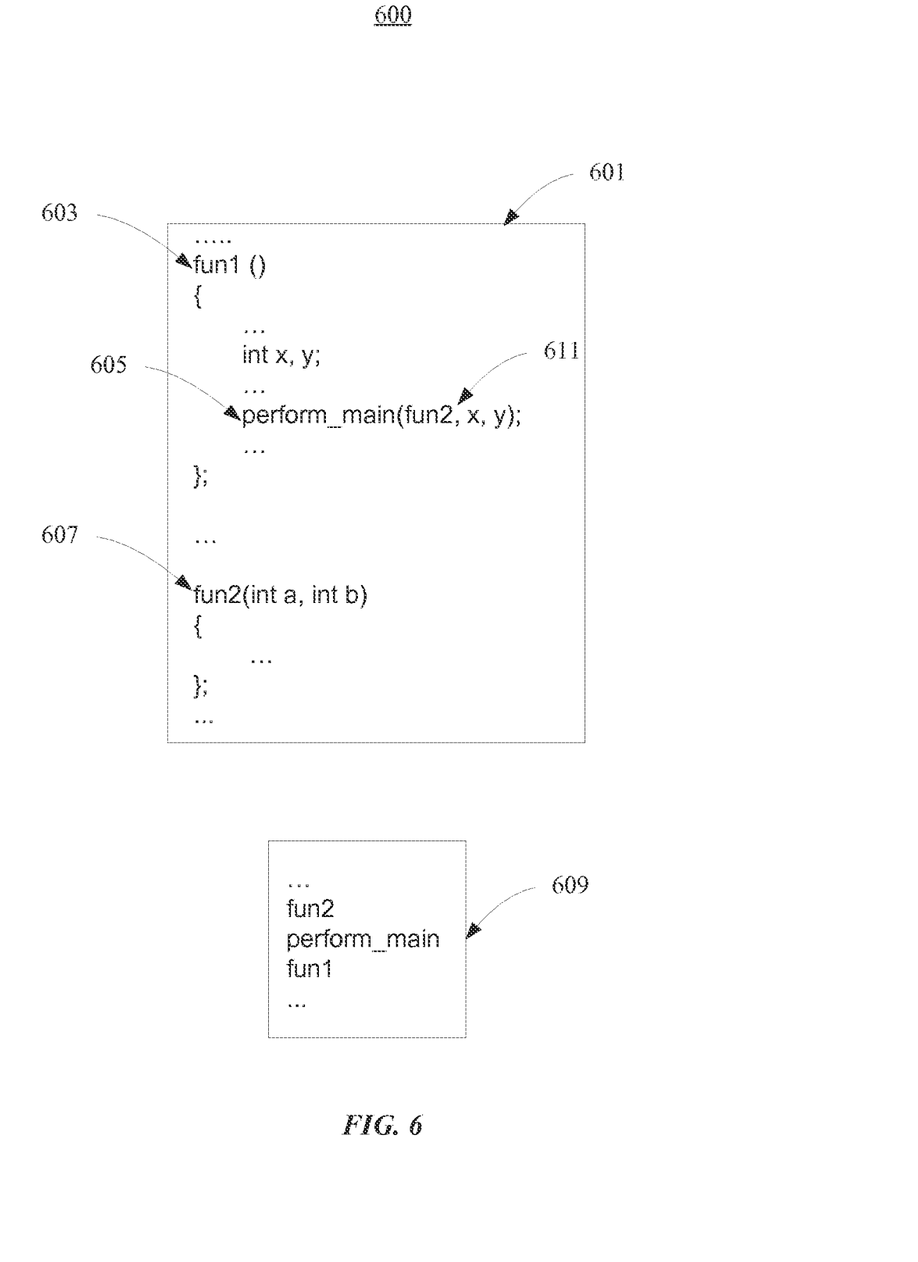
FIG. 6 is a block diagram illustrating one example of codes executed via separate threads to migrate a stack.

FIG. 6 is a block diagram 600 illustrating one example of codes executed via separate threads to migrate a stack. A thread, such as Source thread 125 of FIG. 1, may perform operations for code block 601 including calling a function fund 603. The function fun1 601 may call a single-thread function fun2 607 executable by one thread at a time. The function fun2 607 may be performed in a synchronized manner among multiple threads by calling an API perform_main 605 with parameters including pointers to the function fun2 611. Execution of the function fun2 may be performed by a separate thread from the thread calling the API perform_main 605. In one embodiment, during a debug session, while a separate thread executing a single-thread function fun2 607 via the API perform_main 605, a stack trace 609 for the separate thread may be displayed including function fun2, API perform_main and function fun1 called by different threads.

Figure 7:
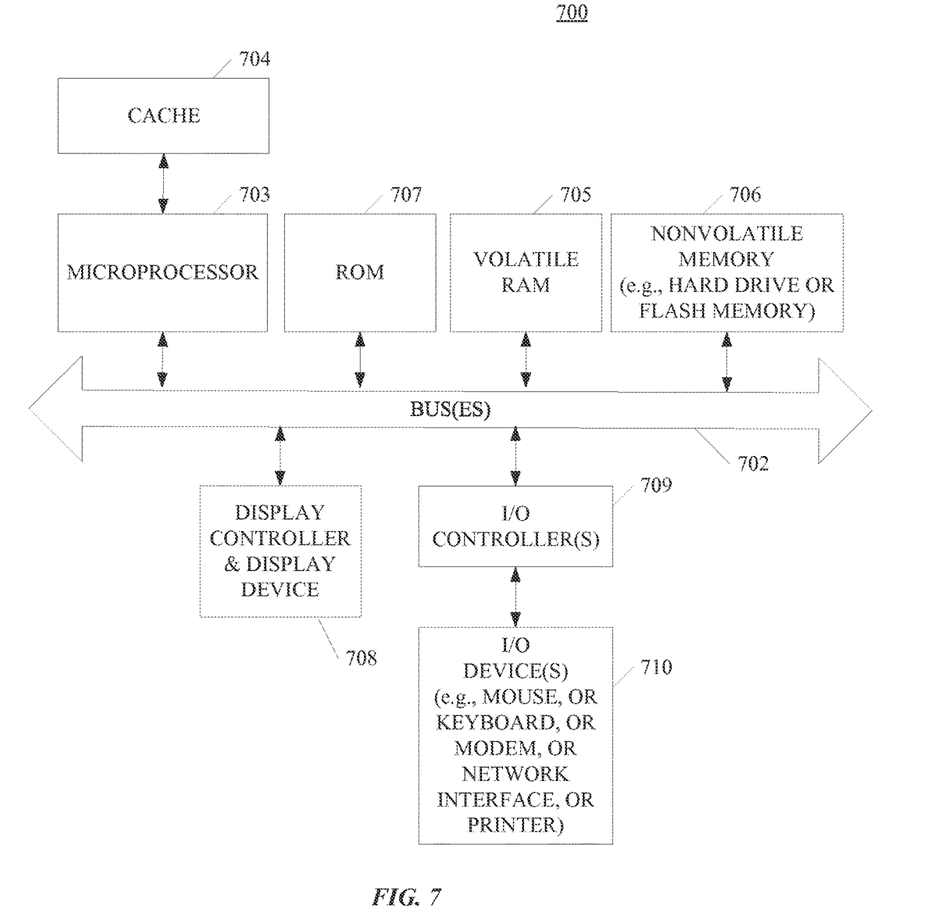
FIG. 7 illustrates one example of a typical data processing system such as a computer system, which may be used in conjunction with the embodiments described herein.

FIG. 7 shows one example of a data processing system such as a computer system, which may be used with one embodiment the present invention. For example, the system 700 may be implemented as a part of the system shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 700, which is a form of a data processing system, includes a bus 702 which is coupled to a microprocessor(s) 703 and a ROM (Read Only Memory) 707 and volatile RAM 705 and a non-volatile memory 706. The microprocessor 703 may retrieve the instructions from the memories 707, 705, 706 and execute the instructions to perform operations described above. The bus 702 interconnects these various components together and also interconnects these components 703, 707, 705, and 706 to a display controller and display device 708 and to peripheral devices such as input/output (I/O) devices 710 which may be mice, keyboards, modems, network interfaces, printers and other devices which are well known in the art. Typically, the input/output devices 710 are coupled to the system through input/output controllers 709. The volatile RAM (Random Access Memory) 705 is typically implemented as dynamic RAM (DRAM) which requires power continually in order to refresh or maintain the data in the memory.

The mass storage 706 is typically a magnetic hard drive or a magnetic optical drive or an optical drive or a DVD RAM or a flash memory or other types of memory systems which maintain data (e.g. large amounts of data) even after power is removed from the system. Typically, the mass storage 706 will also be a random access memory although this is not required. While FIG. 7 shows that the mass storage 706 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 702 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a JAVA™ Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs (Compact Disk Read-Only Memory), DVD (Digital Versatile Disc) ROMs, EPROMs (Erasable Programmable Read Only Memory), EEPROMs (Electrically Erasable Programmable Read-Only Memory), magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer-implemented method, comprising:
   executing a first code from a first thread of a process, wherein:
      the first thread is associated with a first stack having a first stack state, and
      executing the first code generates, in accordance with a thread context that includes a stack pointer pointing to the first stack, a request for a second thread to execute a second code;
   executing the second code from the second thread of the process, wherein executing the second code comprises:
      updating the first stack to be associated with a second stack state by pushing the second stack state to the first stack such that the second stack state is positioned on top of the first stack state, and
      associating the stack pointer with the second stack state; and
   displaying a first stack trace for the second thread, wherein the first stack trace includes the first stack state and the second stack state.

2. The computer-implemented method of claim 1, wherein the execution of the second code is scheduled based on the execution of the first code.

3. The computer-implemented method of claim 1, further comprising:
   displaying a second stack trace for the first thread, wherein the first stack trace for the second thread includes the second stack trace for the first thread.

4. The computer-implemented method of claim 1, wherein the second thread is associated with a second stack that is separate from the first stack.

5. The computer-implemented method of claim 4, wherein associating the stack pointer with the second stack state comprises:
   updating the stack pointer to point to the second stack in accordance with the request.

6. The computer-implemented method of claim 5, further comprising:
   migrating the first stack of the first thread to the second thread; and
   updating the stack pointer pointing to the second stack to point to the first stack to indicate that the first stack is migrated to the second thread.

7. The computer-implemented method of claim 1, wherein the second stack state is generated based on the execution of the second code from the second thread of the process.

8. The computer-implemented method of claim 1, further comprising:
   receiving a debug request for the second thread, wherein the first stack trace for the second thread is displayed in response to the debug request.

9. An apparatus, comprising:
   at least one processor; and
   at least one memory storing instructions that, when executed by the at least one processor, cause the apparatus to:
      execute a first code from a first thread of a process, wherein:
         the first thread is associated with a first stack having a first stack state, and
         executing the first code generates, in accordance with a thread context that includes a stack pointer pointing to the first stack, a request for a second thread to execute a second code;
      execute the second code from the second thread of the process, wherein executing the second code comprises:
         updating the first stack to be associated with a second stack state by pushing the second stack state to the first stack such that the second stack state is positioned on top of the first stack state, and
         associating the stack pointer with the second stack state; and
      display a first stack trace for the second thread, wherein the first stack trace includes the first stack state and the second stack state.

10. The apparatus of claim 9, wherein the execution of the second code is scheduled based on the execution of the first code.

11. The apparatus of claim 9, wherein the second thread is associated with a second stack that is separate from the first stack.

12. The apparatus of claim 11, wherein associating the stack pointer with the second stack state comprises:
updating the stack pointer to point to the second stack in accordance with the request.

13. The apparatus of claim 12, wherein the at least one processor further causes the apparatus to:
update the stack pointer pointing to the second stack to point to the first stack to indicate that the first stack is migrated to the second thread.

14. The apparatus of claim 9, wherein the second stack state is generated based on the execution of the second code from the second thread of the process.

15. At least one non-transitory computer-readable storage medium configured to store instructions that, when executed by at least one processor included in a computing device, cause the computing device to carry out steps that include:
executing a first code from a first thread of a process, wherein
the first thread is associated with a first stack having a first stack state, and
executing the first code generates, in accordance with a thread context that includes a stack pointer pointing to the first stack, a request for a second thread to execute a second code;
executing the second code from the second thread of the process, wherein executing the second code comprises:
updating the first stack to be associated with a second stack state by pushing the second stack state to the first stack such that the second stack state is positioned on top of the first stack state, and
associating the stack pointer with the second stack state; and
displaying a first stack trace for the second thread, wherein the first stack trace includes the first stack state and the second stack state.

16. The at least one non-transitory computer-readable storage medium of claim 15, wherein the second thread is associated with a second stack that is separate from the first stack.

17. The at least one non-transitory computer-readable storage medium of claim 16, wherein associating the stack pointer with the second stack state comprises:
updating the stack pointer to point to the second stack in accordance with the request.

18. The at least one non-transitory computer-readable storage medium of claim 17, wherein the steps further include:
migrating the first stack of the first thread to the second thread; and
updating the stack pointer pointing to the second stack to point to the first stack to indicate that the first stack is migrated to the second thread.

19. The at least one non-transitory computer-readable storage medium of claim 15, wherein the second stack state is generated based on the execution of the second code from the second thread of the process.

20. The at least one non-transitory computer-readable storage medium of claim 15, wherein the steps further include:
receiving a debug request for the second thread, wherein the first stack trace for the second thread is displayed in response to the debug request.

* * * * *